Dec. 21, 1965  G. H. BEACH  3,224,175
APPARATUS FOR SEPARATING LIQUID PARTICLES FROM
LIQUID PARTICLE LADEN GAS
Filed April 26, 1961  2 Sheets-Sheet 1
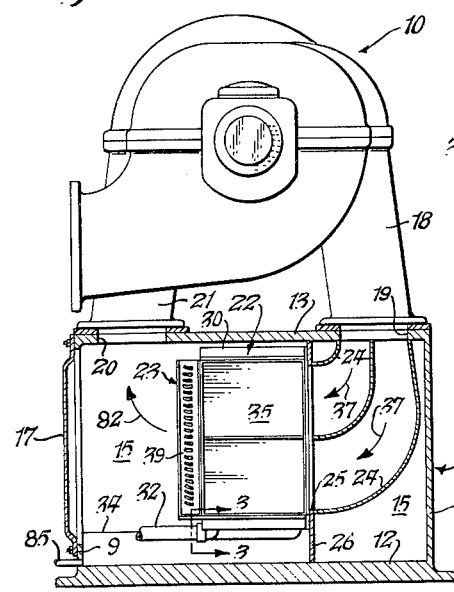
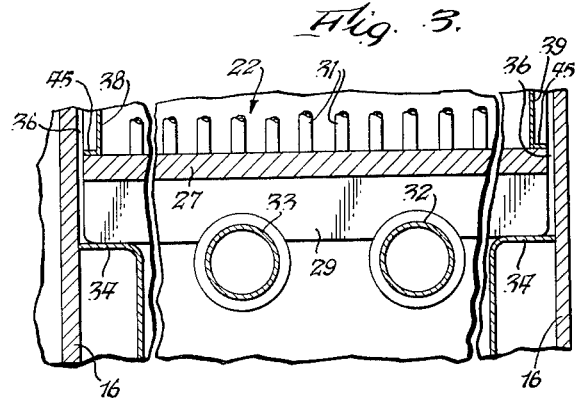
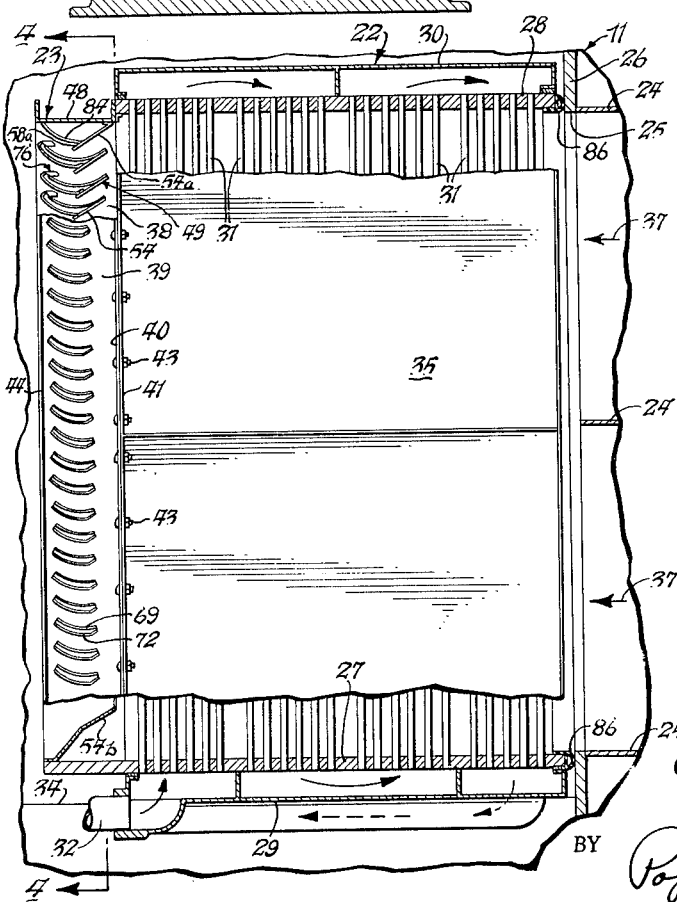
INVENTOR
Gerald H. Beach
BY Popp and Sommer
ATTORNEYS.

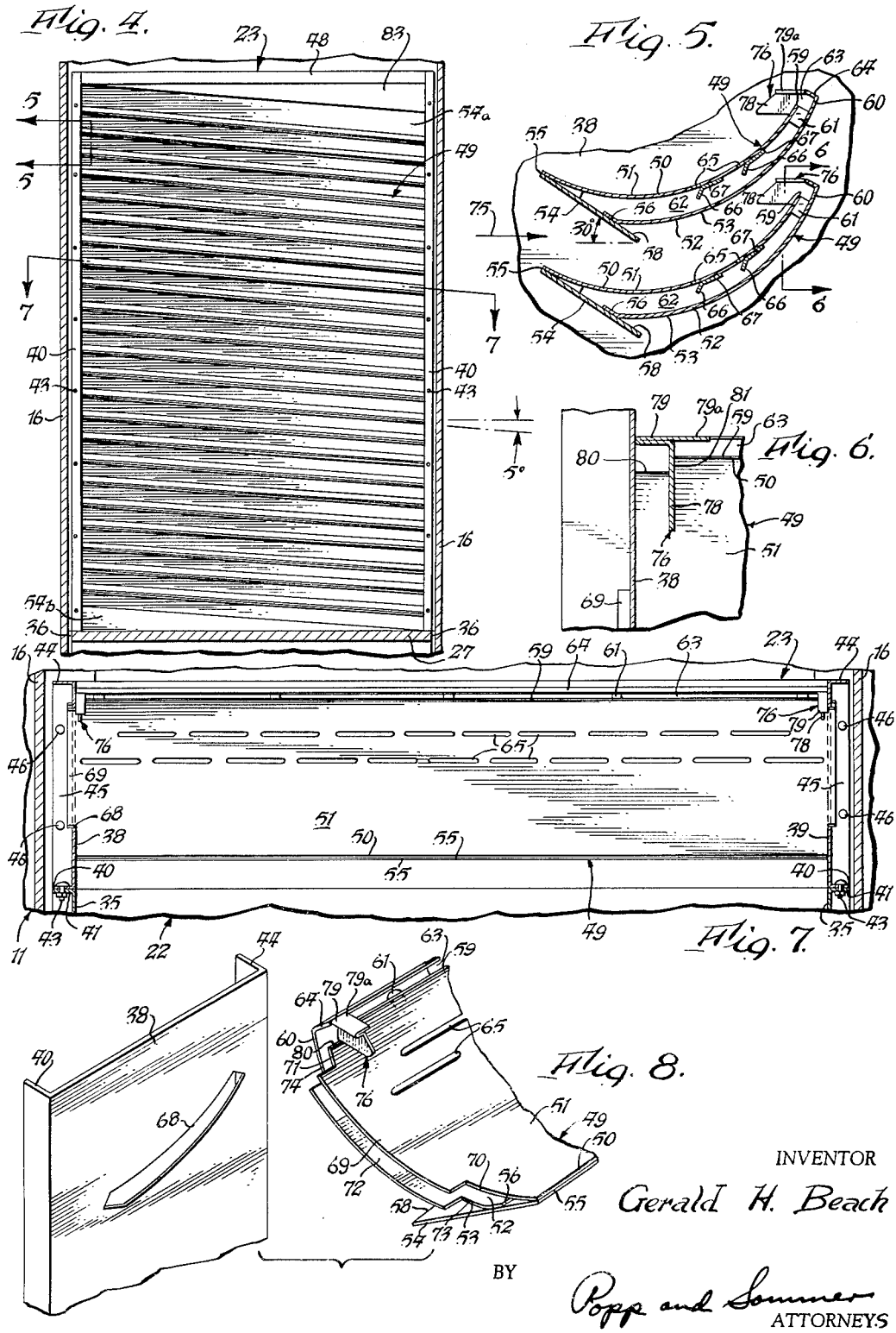

United States Patent Office 3,224,175
Patented Dec. 21, 1965

1

3,224,175
APPARATUS FOR SEPARATING LIQUID PARTICLES FROM LIQUID PARTICLE LADEN GAS
Gerald H. Beach, Olean, N.Y., assignor to Dresser Industries, Inc., Dallas, Tex., a corporation of Delaware
Filed Apr. 26, 1961, Ser. No. 105,634
15 Claims. (Cl. 55—440)

This invention relates to improvements in apparatus for separating liquid particles from liquid particle laden gas.

While the invention may be embodied in apparatus usefully utilized for a variety of applications where it is desired to remove moisture that is entrained in a flowing gas stream, the invention has particularly advantageous application as a moisture separator on the downstream side of an intercooler for a multi-stage centrifugal air compressor.

The principal object of the present invention is to provide a moisture separator which is highly effective in removing moisture particles entrained in the gas stream. In the preferred applcation, removal of entrained condensate resulting from cooling a gas heated by compression prevents impeller wheel erosion and eliminates scale formation on the compressor internals.

Another object is to provide such a moisture separator which utilizes centrifugal force acting upon the moisture particles to separate them from the gas stream.

Another object is to provide such a moisture separator which includes a novel construction of hollow vane in which is collected moisture that has been separated from the gas flowing through the separator.

A further object is to provide such a moisture separator which is designed to minimize reentry of separated moisture from the interior of the hollow vanes into the flowing gas stream.

Another object is to provide such a moisture separator in which the hollow vanes thereof are disposed so as to be self-draining Other objects are to provide such a moisture separator which is compact, sturdy and relatively easy to construct.

Still other objects and advantages of the present invention will be apparent from the following detailed description of a preferred embodiment thereof illustrated in the accompanying drawings wherein:

FIG. 1 is a partly elevational side and vertical sectional view through a multi-stage centrifugal air compressor mounted on a cooler box which incorporates intercoolers one of which is illustrated and on which a preferred embodiment of the inventive moisture separator is shown mounted.

FIG. 2 is an enlarged view of the intercooler with the moisture separator mounted thereon shown in FIG. 1 and with portions broken away to reveal hidden structure.

FIG. 3 is an enlarged fragmentary vertical sectional view thereof taken generally on line 3—3 of FIG. 1.

FIG. 4 is a vertical sectional view thereof taken on line 4—4 of FIG. 2 and illustrating in elevation the upstream end of the inventive moisture separator.

FIG. 5 is an enlarged fragmentary vertical sectional view thereof taken on line 5—5 of FIG. 4.

FIG. 6 is a still further enlarged fragmentary vertical sectional view thereof taken on line 6—6 of FIG. 5.

FIG. 7 is an enlarged fragmentary generally horizontal sectional view thereof taken on line 7—7 of FIG. 4.

FIG. 8 is a fragmentary exploded perspective view illustrating the manner in which the lateral end of a vane is mounted on the end wall of the moisture separator.

Referring to the drawings and particularly FIG. 1, the numeral 10 represents a multi-stage centrifugal type air compressor mounted on a box-like base indicated generally at 11. This base is shown as comprising a horizontal bottom 12, a horizontal upper wall 13, a vertical rear wall 14, a vertical front wall 9 and vertical end walls (not shown) which collectively define a box-like interior which is divided into a plurality of fore-and-aft elongated compartments 15 by laterally spaced vertical partition walls 16 (shown in FIG. 3). The front wall 9 has a large access opening for each compartment 15 which is closed by a removable cover 17.

The centrifugal compressor 10 is shown as having one of its intermediate stages provided with an outlet duct 18 which through an opening 19 provided in the upper wall 13 leads to and communicates with the interior of one of the compartments 15. The upper wall 13 adjacent its front end is shown as provided with an opening 20 which establishes communication between the front portion of the compartment 15 and the interior of an inlet duct 21 which leads to the next stage of the compressor 10.

It is in one of the compartments 15 that an intercooler indicated generally at 22 and the inventive moisture separator indicated generally at 23 on the downstream side of the intercooler 22, are arranged.

Gas entering the compartment 15 is directed by the curved guide walls 24 to the opening 25 provided in a transverse vertical partition wall 26 extending across the compartment 15 between adjacent longitudinal partition walls 16. The incoming gas flows in the direction of the arrows indicated at 37. The upstream side of the intercooler 22 is arranged against the cross wall 26, as best shown in FIG. 2.

The intercooler 22 is of the fin and tube type with a counter-flow, multi-pass cooling water arrangement. The intercooler is shown as a box-like structure comprising a lower water header 29 having a horizontal plate 27, an upper water header 30 having a horizontal plate 28, a plurality of vertical tubes 31, preferably having thereon fins (not shown), arranged between the plates 27 and 28 and enclosed on the sides by side walls 35. The headers 29 and 30 are suitably internally partitioned to provide the necessary passages for counter-flow of water indicated by the arrows shown in FIG. 2. The lower header is shown as connected to a cooling water inlet pipe 32 and a cooling water outlet pipe 33. Further details of the internal construction of the intercooler 22 are deemed not necessary to be given here because this intercooler forms no part of the present invention.

The intercooler 22 is supported on rails 34 which extend fore-and-aft of the compartment 15 between the front cover 17 and intermediate cross wall 26. These rails are arranged immediately above the bottom wall 12. The horizontal upper surface of the rails 34 engage lateral shoulders formed on the lower cooling water heater 29, as shown in FIG. 3. In this manner, the intercooler 22 with the moisture separator 23 mounted thereon as will be hereinafter explained, can be inserted into and removed from the compartment 15 by sliding the unit along the rails 34 through the access opening in the front wall 9, the cover 17 being removed for this purpose.

Immediately above the lower cooling water header 29 the lower header plate 27 extends forwardly beyond the downstream side of the intercooler (as shown in FIG. 2) to provide a support for the moisture separator 23. This floor plate 27 has a clearance along each longitudinal edge between it and the opposing surface of the adjacent partition 16, as shown at 36 in FIG. 3.

The construction of the moisture separator which forms the subject matter of the present invention will now be described. This separator is shown as comprising a pair of side walls or panels 38 and 39. Each of the side walls 38 and 39 is shown as having an outwardly turned vertical attaching flange 40 along its upstream edge which opposes a similar flange 41 formed on the side walls 35 of the intercooler 22. The flanges 40 and 41 are shown as fastened together at intervals by bolts and nuts indicated at 43.

In order to rigdify the side walls 38 and 39, each is further shown as having an outturned vertical flange 44 along its corresponding downstream edge. Further, each of the side walls 38 and 39 is shown as having an outturned horizontal flange 45 along its corresponding bottom edge which rests upon the upper surface of the floor plate 27 and may be secured thereto as by nuts and bolts indicated at 46 in FIG. 7. The upper ends of the side walls 38 and 39 are shown as suitably connected together by a horizontal channel-shaped member 48 arranged with its flanges extending upwardly, as shown in FIG. 2. Thus the extended portion of the plate 27, the end walls 38 and 39 and the channel member 48 provide a rectangular frame.

Between the inner opposing surfaces of the separator side walls 38 and 39 are arranged a plurality of hollow curved vanes severally indicated generally at 49. The vanes 49 are shown as arranged generally horizontally but actually slightly inclined to the horizontal for a purpose later explained herein. Each of the vanes 49 is shown as including an upper curved plate or side wall 50 having an upwardly facing outer concave surface 51, a lower curved plate or side wall 52 having a downwardly facing outer convex surface 53, these plates 50 and 52 being maintained in spaced relation and joined at their upstream ends by an impingement plate 54. The impingement plate 54 is flat and is suitably joined as by welding along its upstream edge to the upstream edge of the upper vane wall 50 to provide a knife edge indicated at 55. It will be noted that the juncture of the flat impingement plate 54 with the upper vane wall 50 is generally tangential. The impingement plate 54 is suitably connected as by welding to a flat attaching flange 56 formed along the upstream edge of the lower vane wall 52. The impingement plate 54 is shown as projecting downstream from such juncture with the lower vane wall 52 to provide a lip portion or element 58 which is disposed divergently with respect to the lower vane wall 52.

The upper vane wall 50 is shown as having a downstream edge 59. The lower vane wall 52 extends arcuately in a downstream direction beyond the edge 59 of the upper vane wall 50 as indicated at 60. The downstream ends of the vane walls 50 and 52 are maintained in a spaced relationship. For this purpose a plurality of spacers severally indicated at 61 are provided. Each of these spacers 61 is preferably in the form of a block which is suitably connected as by welding to the opposing inner faces of the vane walls 50 and 52. The spacers 61 are shown as arranged at intervals along the longitudinal downstream edge 59 of the upper vane wall 50.

The construction of the vane 49 so far described provides a hollow interior 62. Access to the interior 62 is provided by a continuous opening 63 formed by the space between the downstream edge 59 of the upper vane wall 50 and the inturned downstream end wall 64 formed on the downstream edge of the extended portion 60 of the lower vane wall 52. The free edge of the inturned downstream end portion 64 terminates in an imaginary curved projection of the upper concave surface 51 of the upper vane wall 50. In effect, the opening 63 is in the upper concave surface of the vane adjacent its downstream edge and extends therealong for the full length thereof.

Access to the interior 62 of each vane 49 is also provided by intermediate openings 65. As best shown in FIG. 7, the openings 65 are elongated slots provided in the upper curved wall 50 and are arranged in spaced end-to-end fashion in two generally parallel rows which extend substantially for the full length of the vane and generally parallel to the continuous opening 63 at the downstream end of the vane.

Referring to FIG. 5, each of the rows of discontinuous openings 65 is partially covered on its inside by a drip strip 66 having an attaching flange 67 which is suitably fastened to the inside or lower surface of the upper vane wall 50 in any suitable manner as by being welded thereto. The drip strip 66 for each row of discontinuous openings 65 is arranged on the downstream side of the slots or openings in such row and extends divergently with respect to the upper vane wall 50 in an upstream direction and terminates in a free edge spaced from the corresponding lower vane wall 52. Such drip strips 66 tend to prevent moisture collected within the vane interior from passing outwardly through the openings 65 as will be explained more fully later herein.

The means for mounting each end of each vane 49 upon the corresponding end wall 38 or 39 are the same. A typical connection of a vane 49 with the end wall 38 is illustrated in FIG. 8. The side wall 38 is shown as provided with a generally crescent-shaped opening 68 extending therethrough. The upper vane wall 50 is shown as having a longitudinally projecting end portion 69 which is narrower in a circumferential arcuate direction than the length of the upper vane wall 50 in the same direction so as to provide a laterally facing shoulder 70 at the upstream end of this upper wall and a laterally facing shoulder 71 at the downstream end of this wall. Similarly, the lower vane wall 52 is shown as having a longitudinally extending end portion 72 which is narrower in a circumferential direction than this vane wall 52 in the same direction, thereby to provide a laterally facing shoulder 73 adjacent the upstream end of this lower wall and a laterally facing shoulder 74 adjacent the downstream end of this wall. The outer ends or laterally facing edges of the end portions 69 and 72 lie in the same vertical plane. These end portions 69 and 72 are adapted to project through the crescent-shaped opening 68 so that the shoulders 70, 71, 73 and 74 abut against the inside face of the end wall 38. When in this position the vane 49 is joined to the end wall 38 in any suitable manner as by being welded thereto which is preferred.

As best shown in FIG. 7, when each vane 49 is assembled to the end walls 38 and 39, the end portions 69 and 72 of the upper and lower walls of the vane project laterally beyond the outside surface of these side walls, thereby to provide a spout. As will be explained more fully later herein, any liquid separated from the liquid particle laden gas and collected within the vane interior 62 may drain from the vane by passing out through the space between the vane end portions 69 and 72. The spout formed thereby allows this liquid to drip a distance somewhat remote from the outside surface of the vane end wall 38 or 39 and this tends to minimize reentrainment of such liquid through a similar opening in a lower vane.

Adverting to FIG. 5, incoming liquid particle laden gas enters the space between two vertically spaced adjacent vanes 49 in the direction of the arrow represented at 75. It will be noted from this figure that the vanes are oriented with respect to the incoming gas so as to be at an angle with respect thereto. This angle is preferably about thirty degrees. The incoming liquid particle laden gas impinges against the plates 54 whereby liquid particles therein strike this plate and coalesce thereon to form drops which at lower velocities drop off the downstream edge of the lip portion 58 of such plate to fall upon the upper concave surface 50 of the next lower vane 49. At higher velocities, turbulent eddies are formed behind the lip portion 58. Under such circumstances the liquid coalescing on the upstream facing side of the impingement plate 54 tends to be held up by such turbulent eddies behind the lip portion 58. This held up liquid works to one end of the vane until stopped by the transverse disposition of the inside face of either the end wall 38 or other end wall 39. The liquid thus collected on the end walls 38 and 39 is swept by fluid flow along the inside of such end wall in a downstream direction.

An important feature of the present invention is to provide means for capturing the liquid so collected and being swept along the inside surfaces of the end walls 38 and 39. As shown in FIGS. 5, 6 and 8, such means comprise a gutter member indicated generally at 76. Such gutter member 76 is shown as including a first wall 78 which is generally vertical and is spaced inwardly from the inside surface of the corresponding end wall 38 or 39 and extends generally parallel thereto. The member 76 also includes a second wall 79 which is generally horizontal and serves as a cover for the space between the opposing wall portions 78 and 38 or 39. The gutter element 76 is preferably held in position by being welded to the vane 49 and also to the corresponding end wall 38 or 39.

As best shown in FIGS. 6 and 8, the downstream edge 59 of the upper vane wall 50 adjacent each end is offset in an upstream direction as indicated at 80. The lower edge of the gutter wall 78 is straight and horizontal and rests upon the downstream facing shoulder 80 and the side of the gutter wall 78 remote from the corresponding end wall 38 or 39 is arranged against the laterally outwardly facing end shoulder 81, as best shown in FIG. 6. Thus, the two walls 78 and 79 of the gutter member 76, jointly with the upper concave surface 51 of the upper wall member 50 and the inside surface of the corresponding end wall 38 or 39, provide a gutter for receiving the liquid swept along such end wall inside surface and which gutter conducts the liquid into the interior of the corresponding vane, such liquid entering the enlarged end portions of the continuous opening 63 provided in the upper surface of the vane at the downstream end thereof.

It will be understood that a gutter member 76 is provided at each end of each vane 49. In order to provide one construction of gutter member 76 which will be suitable for placement at either end of a vane, such member is shown as being formed of a sheet metal blank suitably contoured and bent into T-shaped cross sectional form as represented in FIG. 6 so as to have a lateral upper wall portion 79 or 79a extending horizontally from opposite sides of the vertical wall 78. At one end of the vane, the folded or doubled ply portion 79 of the gutter element will be secured to the end wall 38 and at the opposite end the single ply wall portion 79a will be secured to the end wall 39.

It will be noted that the vertical wall 78 of the gutter member 76 enters the space between the walls of the vanes and is contoured so as to abut the inturned flange portion 64 and the extended portion 60 of the lower vane wall 52.

It will also be noted that the total arcuate extent of each vane 49 is such that an angle of at least 90° is subtended by the vane so that a full 90° turn will be imparted to the gas stream flowing through the moisture separator from upstream edge 55 to downstream edge 64. The gas leaving the separator flows in the direction represented by the curved arrow 82 as shown in FIG. 1.

It is also a feature of the present invention that the vanes 49 are inclined to the horizontal at an angle of about 5°, this angle being represented in FIG. 4. Because of the angular disposition of the vanes to the horizontal the triangular space which would otherwise be present at the top of the stack of vanes 49 is filled by an impingement plate 54a to the upstream edge of which a triangularly shaped vertical wall 83 is attached, as shown in FIG. 4. The plate 54a is generally parallel to and is spaced from the immediate lower vane 49. The vertical and horizontal portions of the perimeter of triangular wall 83 are suitably connected as by welding to the separator frame. The downstream end of the impingement plate 54a provides a lip portion 58a which overhangs the upstream end of a curved plate 84 which is suitably joined to the impingement plate 54a and also to the end walls 38 and 39 and the upper cross frame member 48.

The triangularly shaped opening which would otherwise be provided at the bottom of the tier of spaced vanes 49 is closed by an inclined generally triangularly outlined integral extension 54b of the impingement plate for the lowermost vane 49, this plate extension 54b being suitably connected to the end walls 38 and 39 and also engaging the floor plate 27.

When the intercooler 22 with the moisture separator 23 attached thereto is in operative position within the compartment 15 as shown in FIG. 1, it will be noted that liquid discharged from either the low or high ends of the hollow vanes 49 will drop by gravity through the space provided between the vane end walls 38 and 39 and the corresponding opposing partition walls 16. This liquid is allowed to drain from this space through the clearances 36 into the lower part of the compartment on the forward side of the cross wall 26. The sump thus provided can be drained in turn through a drain line 85 extending outwardly through the front wall 9 of the compartment 15.

When placing the intercooler 22 with the inventive moisture separator 23 mounted thereon as a unit in operative position, the unit is pushed along the rails 34 until a perimetral cushion sealing gasket 86 on the rear face of the intercooler engages the front side of the intermediate transverse wall 26, as shown in FIG. 2.

*Operation*

In explaining the operation, it is assumed that the outlet duct 18 of the air compressor 10 connects the second stage thereof, for example, with the compartment 15 which in turn is connected to the inlet duct 21 for the third stage of the compressor. It will be appreciated that the compressed air or other gas flowing through the outlet duct 18 and through the passages provided by the curved guide walls 24 contains heat of compression and therefore is relatively hot. This hot gas goes from right to left as viewed in FIG. 1 and 2 through the intercooler 23. The air flows around the tubes 31 while cooling water circulates therethrough in a manner well known and understood by those skilled in the art. The cooling of the initially relatively hot gas causes moisture therein to condense into small droplets or liquid particles so that liquid particle laden gas leaves the downstream or left side of the intercooler 22 as shown in FIGS. 1 and 2 to flow into the moisture separator 23.

The gas flows through the curved spaces or paths provided between adjacent pairs of vanes 49. In flowing over these vanes the gas is turned upwardly in direction as represented by the arrow 82 in FIG. 1. The function of the separator 23 is to withdraw the condensate or liquid particles from the fluid flowing through the separator. Two effects are employed by the separator to withdraw moisture. One is the impingement of the incoming liquid particle laden gas against the impingment plates 54 and 54a, and the second is centrifugal force acting upon the liquid particles as the gas and the particles flow through the spaces between vanes.

Regarding the impingement effect, the liquid particles coalesce on the upstream sides of the plates 54 and 54a which at lower velocities, provide drops which drop off the downstream edge of the lip portion 58 and 58a of these impingment plates. The drops mostly fall upon the upper concave surface of the next lower vane. Since this surface has the continuous opening 63 and the discontinuous openings 65 therein the liquid flows through these openings into the vane interior 62. Because of the inclination of the vanes the moisture collected therein flows by gravity to the low end which is shown as mounted on the vane end wall 39. This is effected by the crescent shaped openings 68 therein being offset vertically with respect to the corresponding openings in the other vane end wall 38 by an amount sufficient to provide the more or less 5° inclination of the vanes to the horizontal as referred to previously.

At higher velocities the liquid coalescing on the upstream face of the impingment plates 54 does not drop off, as it does at lower velocities. Instead the turbulent eddies generated behind the lip portion 58 of the various impingment plates 54 tend to hold up the liquid which runs along the V-shaped groove provided between this lip portion 58 and the adjacent lower vane wall 52. The liquid works principally to the low side of the vane and thence the liquid tends to be blown up or swept along the inside surfaces of the vane end walls 38 and 39. The gutters provided by the gutter elements 76 provide a quiet zone to permit of capturing this liquid which flows through the gutter into the enlarged end portions of the continuous vane opening 63.

Because of the curvature of the vanes, centrifugal force acts on liquid particles carried by the gas flowing through the space between adjacent vanes to throw these particles against the concave upper vane surfaces 51 where the particles coalesce into a liquid film which is moved by the force of fluid flow toward the downstream end of the vanes. Enroute the liquid enters the intermediate discontinuous openings 65 but if it escapes these it is captured by the continuous opening 63.

As referred to previously, the drip strips 66 guard the openings 65 as exits so as to prevent liquid which may run down the lower or inside surface of the upper vane side wall 50 from being drawn outwardly through the intermediate openings 65 to re-enter the gas stream. The flow of gas through the spaces between adjacent vanes tends to produce a region of reduced pressure and hence generates a venturi effect which tends to draw liquid from the inside of the vanes outwardly through the intermediate openings 65 if liquid is on the inside surface of the upper vane wall. However, the provision of the drip strips 66 leads this moisture running down the inside of the upper vane wall away from the openings 65, allowing this liquid to drop off the free ends of these strips 66 onto the inside surface of the lower vane wall 52.

Separated liquid collected within the vane interiors drains out the spouts produced by the extended end portion 69 and 72 of the several vanes and this liquid drops onto the rails 34 below and can flow thereover into the lowermost portion of the compartment 15 from which it can be drained through the line 85.

It will also be noted that the vanes 49 as a whole are oriented through an angle of about 30° with respect to the direction of the incoming gas stream represented by the arrows 75 in FIG. 4. This exposes more area of the impingement plates 54 and 54a to the incoming gas and as well permits the vanes to be longer to provide a longer travel path thereby permitting centrifugal force to act upon the moisture particles for a longer time. This produces more efficient moisture separation.

If it is desired to remove the moisture separator 23 and intercooler 22 for service work to be performed on either, it will be seen that it is merely necessary to remove the cover 17 and pull out the separator 23 and intercooler 22 unit by sliding the same along the rails 34. The simple reverse procedure is followed to restore the intercooler 22 with a separator 23 mounted thereon, to an operative position as shown in FIG. 1.

It is preferred to fabricate the moisture separator 23 of corrosion resistant sheet materials.

From the foregoing it will be seen that the preferred embodiment of the present invention achieves the various objectives stated. Since modifications in the construction of the moisture separator 23 may occur to those skilled in the art, it is to be understood that the preferred embodiment shown and described is illustrative and not limitative of the present invention, the scope of which is to be measured by the appended claims.

What is claimed is:

1. In apparatus for separating liquid particles from liquid particle laden gas, the combination comprising a first end wall, a hollow curved vane arranged transversely of the direction of fluid flow and having an end mounted on said first end wall so as to extend outwardly from one side thereof, said vane also including a first curved wall having a concave outer surface and a second curved wall having a convex outer surface and a downstream end wall, said first curved wall adjacent said downstream end wall having an opening extending outwardly from said one side of said first end wall along said downstream end wall and communicating with the interior of said vane, and means cooperating with said one side of said first end wall and concave surface to provide a gutter arranged immediately upstream of said opening and communicating therewith, said means including a first gutter wall arranged substantially parallel to said first end wall and entering said opening and extending into contact with said downstream end wall and second curved wall and also including a second gutter wall spaced from said concave surface and connected to said first end and first gutter walls and abutting said downstream end wall, that portion of said opening between said first end wall and first gutter wall being wider in the direction of fluid flow than that portion of said opening on the other side of said first gutter wall, whereby liquid swept by the fluid flow along said one side of said first end wall is conducted by such gutter means to such wider portion of said opening.

2. In apparatus for separating liquid particles from liquid particle laden gas, the combination comprising spaced end walls, and a hollow elongated curve vane arranged transversely of the direction of fluid flow and having its opposite ends mounted on said end walls, said vane including a side wall having a concave outer surface and continuous opening adjacent its downstream edge and extending for the full length of said vane and upstream thereof at least two spaced rows of discontinuous openings generally parallel to said continuous opening, the openings in one of said rows overlapping adjacent openings in the other of said rows, the openings in said rows jointly extending for substantially the full length of said vane, all of said openings communicating with the interior of said vane, whereby said discontinuous openings receive liquid at lower velocities and said continuous opening receives liquid at higher velocities.

3. In apparatus for separating liquid particles from liquid particle laden gas, the combination comprising spaced end walls, and a hollow vane arranged transvsrsely of the direction of fluid flow and having its opposite ends mounted on said end walls, said vane including opposing side walls one of which has openings therein which are elongated in a direction transverse to the direction of fluid flow and communicate with the interior of said vane and also including drip strip means arranged interiorly of said vane on the inside of said one of said side walls and on the downstream side of said openings in juxtaposition thereto and inclining inwardly of the vane and toward the upstream edge of said openings and terminating in a free edge spaced from the other of said side walls.

4. In apparatus for separating liquid particles from liquid particle laden gas, the combination comprising spaced end walls, and a plurality of spaced hollow curved vanes arranged generally parallel to each other and transversely of the direction of fluid flow and severally having their opposite ends mounted on said end walls, each of said vanes including a first side wall having a concave outer surface and a second side wall having a convex outer surface, each of said first side walls having openings therein which are elongated in a direction transverse to the direction of fluid flow and communicate with the interior of the corresponding vane and also including drip strip means arranged interiorly of such vane on the inside of its said first side wall and on the downstream side of said openings in juxtaposition thereto and inclinding inwardly of the vane and toward the upstream edge of said openings, and terminating in a free edge spaced from the corresponding one of said second side walls, whereby liquid moving along said inside in an upstream direction is prevented from reentering the fluid stream flowing between adjacent vanes through said openings due to venturi effect.

5. In apparatus for separating liquid particles from liquid particle laden gas, the combination comprising spaced end walls, spaced first and second elongated curved vanes arranged generally horizontally and transversely of the direction of fluid flow and severally having their opposite ends mounted on said end walls, said first vane having convex lower surface, said second vane being hollow and having a concave upper surface which is spaced from and opposes said convex surface, said concave surface having an opening therein adjacent its downstream edge and extending therealong for the full length of said second vane, said vanes being severally inclined to the horizontal at an angle of about 5°, means adjacent that one of said end walls which is adjacent the lower ends of said vanes and arranged to provide a gutter immediately upstream of said opening and communicating therewith, and a lip element extending divergently from said convex surface in a downstream direction beginning adjacent the upstream end of said first vane and having a free downstream edge spaced from said convex surface, whereby liquid particles in incoming liquid particle laden gas impinging said lip element coalesce thereon to form drops at lower velocities which drop off said downstream edge but which at higher velocities due to turbulent eddies behind said lip element are held up and work to the lower end of said first vane and creep up said one of said end walls to be captured by said gutter means.

6. In apparatus for separating liquid particles from liquid particle laden gas, the combination comprising spaced end walls, a plurality of hollow elongated curved vanes arranged between said end walls transversely of the direction of fluid flow and severally having their opposite ends mounted on said end walls, each of said vanes including spaced curved side walls, one of which has a concave outer surface and the other of which has a convex outer surface, and a flat impingement plate joining the upstream ends of said side walls to provide an upstream knife-edge at the juncture with said one of said side walls and also providing a lip portion arranged externally of such vane and projecting downstream from the juncture with said other of said side walls and divergently disposed with respect thereto, said plates being disposed at an angle of about 30° with respect to the direction of flow of incoming liquid particle laden gas.

7. In apparatus for separating liquid particles from liquid particle laden gas, the combination comprising spaced end walls, a plurality of hollow elongated curved vanes arranged between said end walls transversely of the direction of fluid flow and severally having their opposite ends mounted on said end walls, each of said vanes including spaced curved side walls, one of which has a concave outer surface and the other of which has a convex outer surface, and a flat impingement plate joining the upstream ends of said side walls to provide an upstream knife-edge at the juncture with said one of said side walls and also providing a lip portion arranged externally of such vane and projecting downstream from the juncture with said other of said side walls and divergently disposed with respect thereto, said plates being disposed at an angle of about 30° with respect to the direction of flow of incoming liquid particle laden gas, the arcuate extent of each of said vanes between said upstream knife-edge and its downstream edge subtending an angle of at least 90°.

8. In apparatus for separating liquid particles from liquid particle laden gas, a hollow curved vane construction comprising spaced curved walls, one of which has a concave outer surface and the other of which has a convex outer surface, a flat plate joining the upstream ends of said walls to provide an upstream knife-edge at the juncture with said one wall and also providing a lip portion projecting downstream from the juncture with said other wall and divergently disposed with respect thereto, the downstream end of said other wall being bent toward said one wall to provide an edge which is downstream of the downstream edge of said one wall and spaced therefrom to provide therebetween a continuous opening for the full length of said vane and communicating with the vane interior, and means maintaining a spaced relationship between the downstream ends of said walls.

9. In apparatus for separating liquid particles from liquid particle laden gas, a hollow curved vane construction comprising spaced curved walls, one of which has a concave outer surface and the other of which has a convex outer surface, a flat plate joining the upstream ends of said walls to provide an upstream knife-edge at the juncture with said one wall and also providing a lip portion projecting downstream from the juncture with said other wall and divergently disposed with respect thereto, the downstream end of said other wall being bent toward said one wall to provide an edge which is downstream of the downstream edge of said one wall and spaced therefrom to provide therebetween a continuous opening for the full length of said vane and communicating with the vane interior, and spacers arranged between said walls on the upstream side of said continuous opening and disposed at intervals longitudinally thereof.

10. In apparatus for separating liquid particles from liquid particle laden gas, a hollow curved vane construction comprising spaced curved walls, one of which has a concave outer surface and the other of which has a convex outer surface, a flat plate joining the upstream ends of said walls to provide an upstream knife-edge at the juncture with said one wall and also providing a lip portion projecting downstream from the juncture with said other wall and divergently disposed with respect thereto, the downstream end of said other wall being bent toward said one wall to provide an edge which is downstream of the downstream edge of said one wall and spaced therefrom to provide therebetween a continuous opening for the full length of said vane and communicating with the vane interior, said one wall intermediate its upstream and downstream ends having a series of slots arranged in a row extending generally parallel to said continuous opening, and a drip strip secured to the inside of said one wall on the downstream side of said slots and extending divergently with respect to said one wall in an upstream direction.

11. In apparatus for separating liquid particles from liquid particle laden gas, the combination comprising a first end wall, a hollow curved vane arranged transversely of the direction of fluid flow and having an end mounted on said first end wall so as to extend outwardly from one side thereof, said vane also including a first curved wall having a concave outer surface and a second curved wall having a convex outer surface and a downstream end wall, said first curved wall adjacent said downstream end wall having an opening extending outwardly from said one side of said first end wall along said downstream end wall and communicating with the interior of said vane, and means cooperating with said one side of said first end wall and concave surface to provide a gutter arranged immediately upstream of said opening and communicating therewith, said means including a T-shaped gutter member including a first gutter wall and a second gutter wall crossing said first gutter wall and having lateral portions on opposite sides thereof, said first gutter wall being arranged substantially parallel to said first end wall and entering said opening and extending into contact with said downstream end wall and second curved wall, that one of said lateral portions of said second gutter wall which is adjacent said first end wall being connected thereto and also abutting said downstream end wall; whereby liquid swept by fluid flow along said one side of said first end wall is conducted by such gutter means to said opening.

12. In apparatus for separating liquid particles from liquid particle laden gas, the combination comprising at least two superposed and spaced apart curved vanes each of which between its upstream and downstream edges subtends an angle of at least 90° to provide a curved flow path, an impingement plate joined to the convex side of that one of said vanes which opposes the concave side of the other and extending divergently from said convex side in a downstream direction into the space between said vanes to provide a lip having a free downstream edge spaced from the surfaces of both of said sides, said plate being inclined at an angle of about 30° with respect to the direction of flow of incoming liquid particle laden gas.

13. In apparatus for separating liquid particles from liquid particle laden gas, the combination comprising spaced end walls, at least two curved vanes arranged transversely of the direction of fluid flow and each having its opposite ends mounted on said end walls, one of said vanes having a convex outer surface free of any opening therein and the other of said vanes having a concave outer surface which opposes and is spaced from said convex surface, and a lip element joined to said convex surface and extending divergently therefrom in a downstream direction and projecting into the space betewen said vanes and terminating in a free downstream edge spaced from both of such surfaces, whereby liquid particles in incoming liquid particle laden gas impinging said lip element coalesce thereon.

14. In apparatus for separating liquid particles from liquid particle laden gas, the combination comprising spaced end walls, at least two curved vanes arranged transversely of the direction of fluid flow and each having its opposite ends mounted on said end walls, one of said vanes having a convex outer surface free of any opening therein and the other of said vanes having a concave outer surface which opposes and is spaced from said convex surface, said other of said vanes being hollow and its said concave surface having openings therein communicating with the interior of such vane, and a lip element joined to said convex surface and extending divergently therefrom in a downstream direction and projecting into the space between said vanes and terminating in a free downstream edge spaced from both of such surfaces, whereby liquid particles in liquid particle laden gas impinging said lip element coalesce thereon to form drops at lower velocities which are blown onto said concave surface to flow through said openings therein.

15. In apparatus for separating liquid particles from liquid particle laden gas, the combination comprising spaced end walls, at least two curved vanes arranged generally horizontally one above the other and transversely of the direction of fluid flow and each having its opposite ends mounted on said end walls, the lower surface of such upper vane being convex and free of any opening therein, the upper surface of such lower vane being concave and spaced from said convex surface, said upper vane being inclined to the horizontal at an angle of about 5°, and a lip element joined to said convex surface and extending divergently therefrom in a downstream direction and projecting into the space between said vanes and terminating in a free downstream edge spaced from both of such surfaces, whereby liquid particles in incoming liquid particle laden gas impinging said lip element coalesce thereon to form drops at lower velocities which drop off said downstream edge but which at higher velocities due to turbulent eddies behind said lip element are held up and work to the lower end of said upper vane.

References Cited by the Examiner
UNITED STATES PATENTS

| | | | |
|---|---|---|---|
| 877,460 | 1/1908 | Brunner et al. | 55—445 |
| 1,519,428 | 12/1924 | Willisch | 55—443 |
| 2,755,886 | 7/1956 | Campbell | 55—424 |

FOREIGN PATENTS

| | | |
|---|---|---|
| 39,335 | 10/1909 | Austria. |
| 257,368 | 3/1913 | Germany. |
| 615,363 | 7/1935 | Germany. |
| 3,668 | 2/1904 | Great Britain. |

HARRY B. THORNTON, *Primary Examiner.*

HERBERT L. MARTIN, *Examiner.*